United States Patent
Bogren et al.

(10) Patent No.: US 12,043,022 B2
(45) Date of Patent: Jul. 23, 2024

(54) COMPOSITE NONWOVEN SHEET MATERIAL

(71) Applicant: Essity Hygiene and Health Aktiebolag, Gothenburg (SE)

(72) Inventors: Maria Bogren, Gothenburg (SE); Hannu Ahoniemi, Gothenburg (SE)

(73) Assignee: ESSITY HYGIENE AND HEALTH AKTIEBOLAG, Gothenburg (SE)

( * ) Notice: Subject to any disclaimer, the term of this patent is extended or adjusted under 35 U.S.C. 154(b) by 651 days.

(21) Appl. No.: 16/965,088

(22) PCT Filed: Feb. 2, 2018

(86) PCT No.: PCT/EP2018/052602
§ 371 (c)(1),
(2) Date: Jul. 27, 2020

(87) PCT Pub. No.: WO2019/149365
PCT Pub. Date: Aug. 8, 2019

(65) Prior Publication Data
US 2021/0114341 A1    Apr. 22, 2021

(51) Int. Cl.
*B32B 5/26*    (2006.01)
*B32B 5/02*    (2006.01)
(Continued)

(52) U.S. Cl.
CPC ............... *B32B 5/26* (2013.01); *B32B 5/022* (2013.01); *B32B 7/09* (2019.01); *D04H 1/425* (2013.01);
(Continued)

(58) Field of Classification Search
CPC ...... D04H 1/425; D04H 1/43835; D04H 1/38; D04H 1/26; D04H 1/498; D04H 1/4291;
(Continued)

(56) References Cited

U.S. PATENT DOCUMENTS

| | | |
|---|---|---|
| 3,837,995 A | 9/1974 | Floden |
| 4,813,864 A | 3/1989 | Balk |

(Continued)

FOREIGN PATENT DOCUMENTS

| | | |
|---|---|---|
| CA | 841938 A | 5/1970 |
| CN | 101133199 A | 2/2008 |

(Continued)

OTHER PUBLICATIONS

Polypropylene, https://poly.chemnetbase.com/faces/chemical/FullScreenEntry.xhtml?product=POLY&ispoly=true&fromEx, retrieved Apr. 2, 2018.*

(Continued)

*Primary Examiner* — Jennifer A Gillett
(74) *Attorney, Agent, or Firm* — CANTOR COLBURN LLP

(57) ABSTRACT

A composite nonwoven sheet material includes pulp fibers, a reinforcement material and microfibers. The sheet material has one pulp-enriched first outer layer and one microfiber-enriched second outer layer, the reinforcement material is thereby interposed between the pulp-enriched first outer layer and the microfiber-enriched second outer layer and the pulp fibers and the microfibers penetrate the reinforcement material. Also disclosed is a process of producing such composite nonwoven sheet material and the use of such composite nonwoven sheet material.

20 Claims, 4 Drawing Sheets

(51) Int. Cl.
  *B32B 7/09* (2019.01)
  *D04H 1/425* (2012.01)
  *D04H 1/4291* (2012.01)
  *D04H 1/4334* (2012.01)
  *D04H 1/435* (2012.01)
  *D04H 1/4374* (2012.01)
  *D04H 1/4382* (2012.01)
  *D04H 1/498* (2012.01)

(52) U.S. Cl.
  CPC ......... *D04H 1/4291* (2013.01); *D04H 1/4334* (2013.01); *D04H 1/435* (2013.01); *D04H 1/4374* (2013.01); *D04H 1/43825* (2020.05); *D04H 1/43835* (2020.05); *D04H 1/43838* (2020.05); *D04H 1/498* (2013.01); *B32B 2262/0253* (2013.01); *B32B 2262/0261* (2013.01); *B32B 2262/0284* (2013.01); *B32B 2262/062* (2013.01); *B32B 2432/00* (2013.01)

(58) Field of Classification Search
  CPC .... D04H 1/4334; D04H 1/435; D04H 1/4374; D04H 1/43825; D04H 1/43838; D04H 1/492; D04H 3/007; B32B 5/26; B32B 5/022; B32B 7/09; B32B 2262/0253; B32B 2262/0261; B32B 2262/0284; B32B 2262/062; B32B 2432/00; B32B 27/12
  See application file for complete search history.

(56) References Cited

U.S. PATENT DOCUMENTS

| | | | |
|---|---|---|---|
| 4,950,531 A * | 8/1990 | Radwanski | D04H 1/495 442/389 |
| 5,026,587 A | 6/1991 | Austin et al. | |
| 5,382,400 A * | 1/1995 | Pike | D04H 3/147 442/364 |
| 5,545,371 A | 8/1996 | Lu | |
| 6,028,018 A | 2/2000 | Amundson et al. | |
| 6,573,204 B1 | 6/2003 | Philipp et al. | |
| 2002/0146956 A1 | 10/2002 | Ngai | |
| 2003/0003832 A1 | 1/2003 | Childs et al. | |
| 2005/0136772 A1 | 6/2005 | Chen et al. | |
| 2006/0205310 A1 | 9/2006 | Schubert et al. | |
| 2007/0033779 A1 | 2/2007 | Orlandi et al. | |
| 2009/0004942 A1 | 1/2009 | Pedoja et al. | |

FOREIGN PATENT DOCUMENTS

| | | |
|---|---|---|
| CN | 105484106 A | 4/2016 |
| CN | 107303158 A | 10/2017 |
| EP | 2348146 A1 | 7/2011 |
| JP | 2005034617 A | 2/2005 |
| RU | 2090170 C1 | 9/1997 |
| WO | 9803713 A1 | 1/1998 |
| WO | 2009031951 A1 | 3/2009 |
| WO | 2017092791 A1 | 6/2017 |

OTHER PUBLICATIONS

International Searching Authority, Search Report and Written Opinion issued in PCT/EP2018/052602, mailed Jun. 12, 2018 (11 pages).
International Preliminary Examining Authority, Written Opinion issued in PCT/EP2018/052602, mailed Jan. 10, 2020 (6 pages).
International Preliminary Examining Authority, Written Opinion issued in PCT/EP2018/052602, mailed May 12, 2020 (5 pages).
Van't Hof, Aleidus (NLO European Patent and Trademark Attorneys), Response to Written Opinion in PCT/EP2018/052602, filed May 26, 2020 (10 pages).
National Intellectual Property Administration (CNIPA) of the People's Republic of China, Office Action issued Oct. 25, 2021 for Application No. 201880088285.5 filed Feb. 2, 2018 (10 pages).
International Searching Authority, International Preliminary Report of Patentability issued in PCT/EP2018/052602, mailed Jun. 18, 2020 (12 pages).
Russian Patent Office, Office Action issued in RU App. No. 2020127788/03(049243) dated Mar. 24, 2021 (with English translation), 13 pages.
Office Action (No. 5474) issued by the Mexican Patent Office dated Jan. 17, 2024 for corresponding Mexican patent application No. MX/a/2020/008057, untranslated, 2 pages.

* cited by examiner

COMPOSITE NONWOVEN SHEET MATERIAL

CROSS-REFERENCE TO RELATED APPLICATION

This application is a national phase entry of, and claims priority to, International Application No. PCT/EP2018/052602, filed Feb. 2, 2018. The above-mentioned patent application is incorporated herein by reference in its entirety

TECHNICAL FIELD

The present application relates to a composite nonwoven sheet material including pulp fibers and microfibers. The present application further relates to a process of producing such a composite nonwoven material sheet.

BACKGROUND

Absorbent nonwoven sheets are used for wiping various types of spills and dirt in industrial, medical, office and household applications. They typically comprise a combination of synthetic fibers and cellulosic pulp for absorbing water and other hydrophilic substances, as well as hydrophobic substances as for example oils or fats. In addition to sufficient strength, sheets used for wiping require sufficient absorptive power.

The introduction of microfibers opened many new possibilities in wiping. Wipes comprising microfibers have the advantage that they are very efficient in deep cleaning as the microfibers may reach into pores and crevices. Furthermore, wipes comprising microfibers may absorb a liquid very quickly due to the high capillary forces of the material and have a very good dry-wiping ability providing a dry and clean surface after use. However, wipes comprising microfibers have a poor absorption capacity as well as a poor capability of releasing liquid.

Thus, it would be desirable to improve absorbent nonwoven sheets used for wiping as well as production methods thereof.

SUMMARY

It is desired to provide a composite nonwoven sheet material including pulp fibers, a reinforcement material and microfibers having two different surface textures, i.e. a first surface or first outer layer having a relatively soft and smooth surface texture and a second surface or second outer layer having a relatively rough and abrasive surface texture.

It is desired to provide a composite nonwoven sheet material having excellent cleaning performance as well as an excellent liquid absorption.

It is desired to provide a process of producing a composite nonwoven sheet material including pulp fibers, a reinforcement material and microfibers.

The composite nonwoven sheet material described herein achieves these and other technical advantages, thereby improving the field of absorbent nonwoven sheets used for wiping.

BRIEF DESCRIPTION OF THE DRAWINGS

The features and advantages of the invention will be appreciated upon reference to the following drawings. The accompanying drawings, which are incorporated in and constitute a part of this specification, illustrate one or more embodiments of the invention and, together with the general description given above and the detailed description given below, explain the one or more embodiments of the invention.

DETAILED DESCRIPTION

Figure 1:
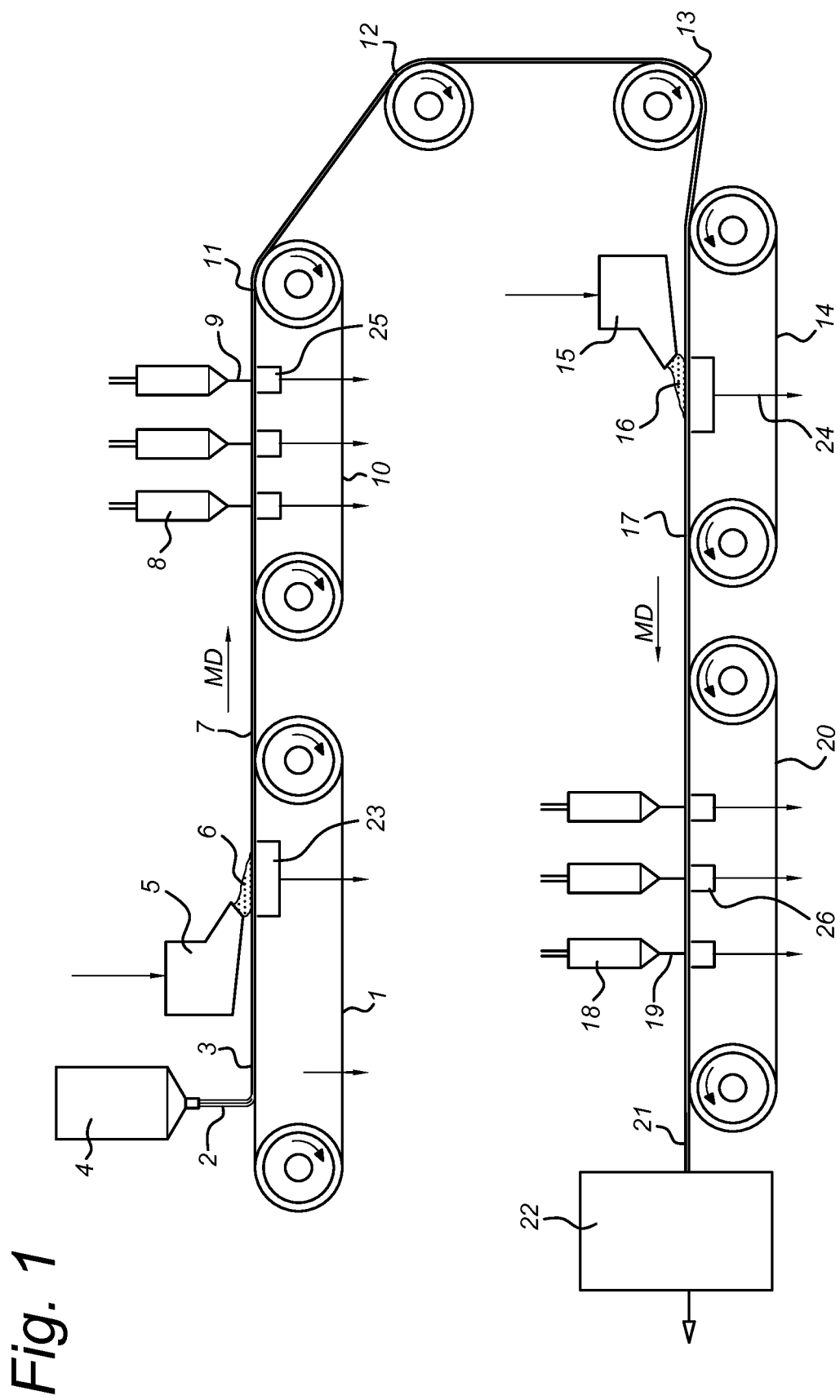
FIG. 1 shows schematically a first embodiment of a production line for producing a composite nonwoven sheet material.

This application pertains to a composite nonwoven sheet material as described below. This application furthermore pertains to a process of producing such composite nonwoven sheet material, a wipe comprising such composite nonwoven sheet material, and the use of such composite nonwoven sheet material. The disclosure and embodiments will be further explored in the following description and examples and in the drawings.

The composite nonwoven sheet material according to embodiments of this invention includes pulp fibers, a reinforcement material and microfibers. The sheet material has one pulp-enriched first outer layer and one microfiber-enriched second outer layer. The reinforcement material is interposed between the pulp-enriched first outer layer and the microfiber-enriched second outer layer. The pulp fibers and the microfibers penetrate the reinforcement material. As a result, the pulp-enriched layer and the microfiber-enriched layer are bonded to the reinforcement material, while the layers and the reinforcement material are still discernible.

Where reference is made herein to the first and the second side of the sheet material, this means the effective surface of the sheet, i.e. the front side and back side (also, interchangeably, referred to as upper and lower surface) of the sheet material.

With pulp-enriched side or outer layer is meant a side or outer layer of the sheet material including at least 50 wt. % of pulp fibers, at least 60 wt. % of pulp fibers, at least 70 wt. % of pulp fibers, at least 80 wt. % of pulp fibers, or at least 90 wt. % of pulp fibers. Such percentage apply in the outermost regions, e.g. the outermost 5% of the thickness of the sheet material.

With microfiber-enriched side or outer layer is meant a side or outer layer of the sheet material including at least 60 wt. % of microfibers, at least 70 wt. % of microfibers, at least 80 wt. % of microfibers, at least 90 wt. % of microfibers. Such percentages apply in the outermost regions, e.g. the outermost 5% of the thickness of the sheet material.

Where weigh ratios or percentages are mentioned herein, these are on dry matter basis (without any water or more volatile substances), unless otherwise specified. Where water weights or percentages are mentioned herein, these are on wet matter basis.

In the present disclosure, the indication "x-y", "between x and y", "from x to y" and the like, wherein x and y are numerals, are considered to be synonymous, the inclusion or exclusion of the precise end points x and y being of theoretical rather than practical meaning.

Dtex is a unit to measure the linear mass density of a fiber or filament and is defined as the mass in grams per 10 000 meters.

Reinforcement Material

The reinforcement material can for example include synthetic filaments. Filaments are fibers that in proportion to their diameter are very long, in principle endless during their production. They can be produced by melting and extruding a thermoplastic polymer through fine nozzles, followed by cooling, preferably using an air flow, and solidification into strands that can be treated by drawing, stretching or crimping. Spun-bond filaments are produced in a similar way by stretching the filaments using air to provide an appropriate fiber diameter that is usually at least 10 μm, usually between 10 and 100 μm. Production of spun-bond filaments is described e.g. in U.S. Pat. Nos. 4,813,864 and 5,545,371. Chemicals for additional functions can be added to the surface of the filaments.

Spun-bond and melt-blown filaments as a group are called spun-laid filaments, meaning that they are deposited directly, in situ, on a moving surface to form a web, that is bonded downstream. Controlling the 'melt flow index' by the choice of polymers and temperature profile is one part of controlling the extrusion and thereby the filament formation. The spun-bond filaments normally are stronger and more even. In particular embodiments, the filaments are laid lengthwise.

Any thermoplastic polymer that has sufficient coherent properties to allow processing in the molten state can in principle be used for producing spun-bond fibers. Examples of useful synthetic polymers are polyolefins, such as polyethylene and polypropylene, polyamides such as nylon-6, polyesters such as poly(ethylene terephthalate) (PET) and polylactides. Polyethylene (PE) and polypropylene (PP) are particularly suitable thermoplastic polymers for use as a reinforcement material. Polylactides are especially suitable for applications where bio-degradability is required or desirable. Copolymers and mixtures of these polymers may of course also be used, as well as natural polymers with thermoplastic properties.

Pulp Fibers

Many types of pulp fibers can be used, especially those having a capacity to absorb water. An example of suitable pulp fibers is cellulose pulp fibers. Cellulose pulp fibers can be selected from any type of pulp and blends thereof. In particular embodiments, the pulp is characterized by being entirely natural cellulosic fibers and can include wood fibers as well as cotton. Specifically, the pulp fibers may be softwood papermaking pulp, although hardwood pulp and non-wood pulp, such as hemp and sisal may be used. The length of pulp fibers may vary from less than 1 mm for hardwood pulp and recycled pulp, to up to 6 mm for certain types of softwood pulp and a mix of lengths, and even shorter lengths for recycled fibers.

The pulp fibers used according to the present disclosure may have a length between 1 and 6 mm, for example between 2 and 5 mm, as for example 3 mm to 4 mm.

The pulp fibers can be mixed with additional particles or additional fibers as for example coarse staple fibers, for example to increase the abrasiveness or roughness of the pulp-enriched layer or the pulp-enriched side. Such coarse staple fibers may have mass densities of more than 1 Dtex, for example 1.1-10 Dtex, such as 1.2-6 Dtex, and lengths of up to e.g. 40 mm, for example 2-30 mm. In such mixtures, the proportion of pulp fibers may be above 50 wt. %, above 60 wt. %, or between 70 and 95 wt. %.

Microfibers

Microfibers are synthetic fibers having a mass density of 1 Dtex or less than 1 Dtex. The diameter of the microfibers depends on the density of the fibers. Thus a 1 Dtex microfiber of polypropylene (PP) has a diameter of about 12 μm. A 1 Dtex microfiber of polyamide (PA) has a diameter of about 11 μm. A 1 Dtex microfiber of PET, PET/PA mixtures or polylactides has a diameter of about 10 μm. The minimum mass density of the microfibers may typically be 0.05 Dtex. In particular embodiments, the microfibers may have a mass density of from 0.1 up to 0.5 Dtex, from 0.12 up to 0.4 Dtex, or from 0.15 to 0.35 Dtex.

The length of the microfibers may be 18 mm or shorter, down to e.g. 1 mm, for example between 2 and 10 mm, or between 3 and 7 mm.

Microfibers may include polymer microfibers such as polyester (PET, polylactide, etc.), polypropylene and/or polyamide microfibers.

Splittable fibers can also be considered for providing microfibers. Suitable splittable fibers include polyethylene-polypropylene, polypropylene-polyester, polypropylene-polyamide, polyethylene-terephthalate-polyamide (PET-PA) bicomponent fibers. Tricomponent or higher multicomponent fibers can be considered as well. For splittable bicomponent or multicomponent fibers, the affinity between the different polymers is controlled carefully such that the polymers will hold together during one part of the product forming process and separate to the desired degree in the latter part of the product forming process. The affinity is adjusted by choosing polymers of suitable chemical type having suitable molecular weights, and/or with suitable physical properties. The affinity may also be adjusted by other steps such as addition of chemicals to the polymer melts that will affect the surface properties of the polymers.

The fibers can be split by a number of different methods such as heat treatment by hot air, water or steam, chemical disintegration of the boundary surface by chemical leaching or plasma treatment, mechanical stressing by physical drawing or bending, by water jet impingement such as hydroentangling. This can be done at fiber production, at web preparation, at web consolidation, at web drying, and/or at a web post treatment process step. The (partial) splitting by hydroentanglement as part of web consolidation can be useful in the present process.

The splitting of a fiber will normally proceed stepwise, with one internal surface between the segments breaking up at a time, i.e. if the splittable fiber consists of more than two segments many variants of partly split fibers will coexist.

One advantage of using splittable fibers that are split in the later stage of the web production process is that during the earlier stages of the process fewer fibers will have to be handled. The fewer fibers handled will also be of a larger diameter, which greatly reduces the mechanical and process load. Especially for a card, this is a great advantage, as a card handles each fiber separately.

The splitting of the fibers provides finer fiber segments that in turn form the microfibers in the final products, thus making it possible to enhance the desired product characteristics.

Sheet Characteristics

The composite nonwoven sheet material as disclosed herein may have a total basis weight ranging between 20 and 120 g/m², more advantageously between 50 and 100 g/m², as for example 80 g/m².

The present composite nonwoven sheet material may include between 25 and 80 wt. % of pulp fibers, between 10 and 40 wt. % of a reinforcement material and between 10 and 40 wt. % of microfibers.

In certain embodiments, the composite nonwoven sheet material includes between 30 and 75 wt. % of pulp fibers, for example between 40 and 65 wt. % of pulp fibers, between 10 and 35 wt. % of the reinforcement material, for example between 15 and 30 wt. % of the reinforcement material, and between 10 and 35 wt. % of microfibers, for example between 15 and 30 wt. % of microfibers.

When the sheet material also includes coarse staple fibers, e.g. in admixture with pulp fibers as described above, the proportion of the coarse staple fibers can be e.g. 1-30 wt. %, such as 2-20 wt. %, or 4-15 wt. %, of the total of pulp, reinforcement material (filaments), microfibers and coarse staple fibers. The proportion of pulp fibers can then be e.g. 20-75 wt. %, such as 25-70 wt. %, or 30-60 wt. %, of the same total.

The present composite nonwoven sheet material has two different sides or outer layers, each having a different surface structure, i.e. a pulp-enriched first side or pulp-enriched first outer layer having a relatively rough and abrasive surface, and a microfiber-enriched second side or microfiber-enriched second outer layer having a relatively soft and smooth surface as compared to the rough surface. A rough and abrasive surface is an uneven or irregular surface that feels harsh in contact with the skin of a person. A wipe having such surface can normally be used to clean surfaces such as hard surfaces. In contrast, a soft and smooth surface has a leveled and consistent texture with few or no irregularities or projections that can be felt by a person's hand in contact with the surface.

As the composite nonwoven sheet material is provided with different surface textures of the opposite sides or opposite layers, the present wipe is provided with bifunctional characteristics, thus enhancing versatile use for cleaning applications. The soft and smooth microfiber-enriched first side or microfiber enriched outer layer is efficient in deep cleaning and is also suitable for polishing purposes. The rough and abrasive pulp-enriched second side or pulp-enriched second outer layer is suitable for scrubbing.

Measurement of the pore volume distribution of certain embodiments of the present composite nonwoven sheet shows that the surface pores have a pore radius between 20 µm and 45 µm or between 25 µm and 40 µm, as for example between 30 and 35 µm. Embodiments of the present composite nonwoven sheet may have bulk pores with a pore radius between 5 and 30 µm, between 10 and 25 µm, or between 15 and 20 µm. The pore volume distribution can be determined as described below; further details can be found in EP2496769. As used herein, surface pores of the composite nonwoven sheet material are pores that are created at the outer surface of the composite nonwoven sheet material, either at the microfiber enriched outer surface or at the pulp-enriched outer surface, created when the cavities, uneven regions, grooves, valleys or hills present at the outer surface of the composite nonwoven sheet are in contact with a flat surface. As used herein, bulk pores of the composite nonwoven sheet material are pores other than surface pores.

The present composite nonwoven sheet material advantageously has a liquid absorbance capacity ranging between 5 g liquid/g composite nonwoven sheet material and 8 g liquid/g composite nonwoven sheet material, for example between 5.5 and 7 g liquid/g composite nonwoven sheet material as for example 6 g liquid/g composite nonwoven sheet material. The liquid absorbance capacity can be determined using the method as described below.

Process of Producing a Composite Nonwoven Material Sheet

A process of producing a composite nonwoven material sheet is provided herein. The process includes:
  forming a fibrous web including a reinforcement material having a first side and a second side (the second side being opposed to the first side), the reinforcement material being interposed between pulp fibers and microfibers or between pulp fibers and splittable fibers for providing microfibers, with the pulp fibers applied on the first side of the reinforcement material and with the microfibers or splittable fibers for providing microfibers applied on the second side of the reinforcement material; and
  hydroentangling the fibrous web to form a composite nonwoven material sheet.

The fibrous web may be hydroentangled from the side including the pulp fibers or from the side including the microfibers or the splittable fibers for providing microfibers or from both the side including pulp fibers and the side including microfibers or splittable fibers for providing microfibers, either simultaneously or in subsequent steps.

In the process, the hydroentangled composite nonwoven material sheet may be subjected to one or more further process steps such as a drying step.

The formed fibrous web including the reinforcement material, the pulp fibers and the microfibers can be manufactured by different processes or variants thereof, of which some embodiments are further explored below.

According to an embodiment, the process for manufacturing a fibrous web includes:
  providing a reinforcement material layer having a first side and a second side;
  applying pulp fibers on the first side of the reinforcement material by wet laying, dry laying or air laying; and
  applying microfibers or splittable fibers for providing microfibers on the second side of the reinforcement material by wet laying, dry laying or air laying.

Possibly, the process for manufacturing the fibrous web further includes a hydroentanglement step after the application of the pulp fibers on the first side of the reinforcement material and before the application of the microfibers or the splittable fibers for providing microfibers on the second side of the reinforcement material.

According to an embodiment, the process for manufacturing a fibrous web includes:
  providing a reinforcement material layer having a first side and a second side;
  applying microfibers or splittable fibers for providing microfibers on the first side of the reinforcement material by wet laying, dry laying or air laying; and
  applying pulp fibers on the second side of the reinforcement material by wet laying, dry laying or air laying.

Possibly, this process for manufacturing the fibrous web further includes a hydroentanglement step after the application of the microfibers or the splittable fibers for providing microfibers on the first side of the reinforcement material and before the application of the pulp fibers on the second side of the reinforcement material.

According to an embodiment, the process to manufacture a fibrous web includes
  providing a layer including pulp fibers by wet laying, dry laying or air laying, applying a reinforcement material layer on one side of the layer including pulp fibers; and applying microfibers or splittable fibers for providing microfibers on the reinforcement material layer by wet laying, dry laying or air laying.

This process for manufacturing the fibrous web may further include a hydroentanglement step after the application of the reinforcement material layer on one side of the layer including pulp fibers.

According to an embodiment, the process for manufacturing a fibrous web includes:

providing a layer including microfibers or splittable fibers for providing microfibers by wet laying, dry laying or air laying, applying a reinforcement material layer on one side of the layer including microfibers; and applying pulp fibers on the reinforcement material layer by wet laying, dry laying or air laying.

Possibly, the process for manufacturing the fibrous web further includes a hydroentanglement step after the application of the reinforcement material layer on one side of the layer including microfibers or splittable fibers for providing microfibers.

In any of these alternative processes, an additional step of pre-integrating the web obtained by depositing the pulp fibers, in particular by foam-laying the pulp fibers, by flushing the web with water on the moving fabric, prior to subjecting the fibrous web containing the reinforcement material, the pulp and the microfibers to the (final) hydroentanglement step. The amount of water and/or the water pressure used for this pre-integration step can be lower than the amount and pressure used for hydroentangling. For example, 0005-0.05 m³ of water per m³ of applied pulp-containing foam can be used, e.g. at a pressure of 5-15 bar. Flushed water can be collected and recycled. The pre-integration step can be performed at any stage between the deposition of the pulp fibers and the (final) hydroentanglement step, but, in particular embodiments, it is performed after the reinforcement material has been deposited. It may further be advantageous to perform the pre-integration step on a first moving fabric and transfer the web to a second moving fabric for hydroentangling; the second moving fabric may have a porosity which is lower than the porosity of the first moving fabric.

Providing a Reinforcement Material

The reinforcement material can be formed from materials that can be applied by various techniques known in the art, including wet-laying, air-laying, dry laying or spun-laying, or it can completely or partly be formed from a pre-fabricated sheet, e.g. a tissue sheet. As an example, the process for producing the reinforcement material can be by laying down filaments, for example spun-bond filaments on an endless forming fabric, i.e. a moving carrier belt, whereby the excess air can be sucked off through the forming fabric.

The filaments (continuous fibers) are laid onto a forming fabric, where they are allowed to form an unbonded web structure, in which the filaments can move relatively freely from each other. This can be achieved by making the distance between the nozzles and the forming fabric relatively large, so that the filaments are allowed to cool and thus to have reduced stickiness before they land on the forming fabric. Alternatively, cooling of the filaments before they are laid on the forming fabric can be achieved e.g. by air. The air used for cooling, drawing and stretching the filaments is sucked through the forming fabric. A good vacuum may be needed to suck off the air. As a further alternative, the filaments can be cooled by spraying with water.

Alternatively, the filaments are laid onto a layer of fibers, for example on a layer including pulp fibers or on a layer including microfibers.

The speed of the filaments as they are laid down may be higher than the speed of the forming fabric, so that the filaments can form irregular loops and bends as they are collected on the forming fabric to form a randomized reinforcement material web. The basis weight of the reinforcement material can advantageously be between 2 and 50 g/m².

Providing the Pulp Fibers and Providing the Microfibers

The pulp fibers can be applied by various techniques known in the art, including wet-laying, foam-laying, air-laying, or dry laying. The pulp fibers can be applied on an endless forming fabric whereby the excess air can be sucked off through the forming fabric. Alternatively, the pulp fibers can be applied on one side of the reinforcement material.

Similarly, the microfibers can be applied by various techniques known in the art, including wet-laying, air-laying, or dry laying. The microfibers can be applied on an endless forming fabric whereby the excess air can be sucked off through the forming fabric. Alternatively, the microfibers can be applied on one side of the reinforcement material.

In a specific process, pulp fibers are applied on one side of the reinforcement material and microfibers are applied on the other side of the reinforcement material. The process may further include a hydroentanglement step after the application of the pulp fibers on the first side of the reinforcement material and before the application of the microfibers on a second side of the reinforcement material. The process may include a second hydroentanglement step after the application of the microfibers.

In an alternative process, microfibers are applied on one side of the reinforcement material followed by pulp fibers being applied on the other side of the reinforcement material. The process may further include a hydroentanglement step after the application of the microfibers on the first side of the reinforcement material and before the application of the pulp fibers on the second side of the reinforcement material. The process may include a second hydroentanglement step after the application of the pulp fibers.

In the following, some techniques that can be used to apply the pulp fibers and to apply the microfibers on the reinforcement material are described in more detail.

Wet-Laying

Pulp fibers as well as microfibers can be made into a slurry in a conventional way and conventional papermaking additives such as wet and/or dry strength agents, retention aids, dispersing agents, may be added to produce a slurry of pulp fibers in water or a slurry of microfibers in water. The slurry including the fibers can be pumped out through a wet-laying head box onto a moving fabric, where it is laid down on the reinforcement material (with the freely moving filaments).

Some of the pulp fibers or some of the microfibers will enter between the filaments, but the larger part will stay on top of the filament web. The excess water is sucked through the web of filaments and down through the forming fabric, by suction boxes arranged under the forming fabric.

A particularly advantageous way of depositing the pulp fibers or the microfibers is by foam formation, which is a variant of wet-laying, in which the cellulosic pulp or microfibers are mixed with water and air to form a three-phase suspension (foam), in the presence of a surfactant, for example between 0.01 and 0.1 wt. % of a non-ionic surfactant so as to form the pulp-containing mixture. The foam may contain between 10 and 90 vol. %, specifically between 15 and 50 vol. %, most specifically between 20 and 40 vol. % of air (or other inert gas). It is transported to the headbox where it is laid on top of the filament web and surplus water and air are sucked off.

It can be particularly advantageous for further reducing surface irregularities and reducing residual surfactant, to apply the pulp by foam-laying in two or more stages. Such a process involves using two consecutive head boxes, with intermittent removal of residual foam (surplus water and air, and some pulp), as described in WO2017/092791. If desired, residual foam removed from the foam-stage can be recycled to the foam-producing stage after de-aeration so as to facilitate the recycling and enhancing the total process efficiency.

Air-Laying and Dry-Laying

Instead of, for example wet-laying, the fibers (the pulp fibers as well as the microfibers) can be applied by dry-laying (in which fibers are carded and then directly applied on the carrier) or air-laying (in which fibers, which may be short, are fed into an air stream and applied to form a random oriented web).

Hydroentangling

The fibrous web including a reinforcement material interposed between pulp fibers and microfibers or between pulp fibers and splittable fibers for providing microfibers is hydroentangled and is mixed and bonded into a composite nonwoven material sheet. In case the fibrous web includes splittable fibers, a major part of the splittable fibers will split during the hydroentanglement. The pulp fibers penetrate in the reinforcement material at the first side of the reinforcement material and the microfibers penetrate in the reinforcement material at the second side of the reinforcement material. An instructive description of the hydroentangling process is given in CA patent no. 841,938.

The hydroentangling step causes the different fiber types to be entangled by the action of a plurality of thin jets of high-pressure water impinging on the fibers. The fine mobile spun-laid filaments are twisted around and entangled with themselves and with the other fibers, which gives a material with a very high strength in which all fiber types are intimately mixed and integrated. Entangling water is drained off through the forming fabric, and can be recycled, if desired after purification (not shown). The energy supply needed for the hydroentangling is relatively low, i.e. the material is easy to entangle. The energy supply at the hydroentangling can appropriately be in the interval of 150-700 kWh per ton of the treated material, measured and calculated as in CA 841938, pages 11-12.

The strength of a hydroentangled material will depend on the amount of entangling points formed, and thus on the lengths of the fibers. When filaments are used, the strength will be determined mostly on the filaments, and be reached fairly quickly in the entangling. Thus, most of the entangling energy will be spent on mixing filaments and fibers to reach a good integration.

The reinforcement material may be substantially unbonded prior to the laying of the pulp-containing mixture and/or before the laying of the microfiber-containing mixture. The filaments of the reinforcement material can be largely free to move with respect to each other to allow mixing and twirling during entangling.

The entangling stage can include several transverse bars with rows of nozzles from which very fine water jets under very high pressure are directed against the fibrous web to provide an entangling of the fibers. The water jet pressure can then be adapted to have a certain pressure profile with different pressures in the different rows of nozzles.

Alternatively, the fibrous web can be transferred to a second entangling fabric before hydroentangling. In this case, the web can also, prior to the transfer, be hydroentangled by a first hydroentangling station with one or more bars with rows of nozzles.

The majority of the entanglement/intertwining of the fibers will be created by the direct impact of the water jet into the material when the kinetic energy from the water jet is transferred into the fibrous structure making the fibers and filaments entangle around themselves and each other. Some part of the entanglement will also come from the reflection of the water jet against the surface on which the material is supported, i.e. the forming fabric carrier (running wire). The more open the support is, the less reflection and the more of the intertwining is coming from the direct hit. This can be used when hydroentangling from the side of the pulp or microfiber layer. On the other hand, a more dense support will result in more reflection of the water jets giving an intertwining from the opposite site of the jet impact. This reflective impact can be used where hydroentangling is desired from the reinforcement layer side. Thus, in the case of entangling from the reinforcement side, a denser, but still sufficiently dewatering, support allows a good reflection making the short fibers integrate into the reinforcement layer. A relatively open support may have an open area of around 10-25%, or 12-20%, of the support surface, and may have a permeability of about 200-600 cfm (cubic foot per min) (=5.7-17 $m^3$/min), or 300-500 cfm (=8.5-14.2 $m^3$/min). A relatively dense support, on the other hand, may have an open area of about 3-15%, or 5-10%, of the support surface, and a permeability in the order of 50-300 cfm (=1.4-8.5 $m^3$/min), or 100-200 cfm (=2.8-5.7 $m^3$/min). An example of the first, relatively open type, is a woven fabric from Albany International named 310K. This fabric has an open area of about 15% and a hydroentanglement surface of 58%, i.e. a closed surface with correction for rounded, i.e. scattering, surfaces. Examples of the second, relatively dense, type, have more metallic-like, i.e. less rounded surfaces, such as so-called nickel sleeves which basically are perforated steel cylinders onto which the material is hydroentangled, with typical open areas of nickel down to 5%, and a flat, i.e. reflecting area of up to about 90%. Herein, and "open area" means a proportion of the total area forming complete holes between upper and lower side of the support.

Thus, in an embodiment, hydroentanglement can be performed using a support (forming fabric, carrier) having of a relatively dense type as described above, in particular when hydroentanglement is performed from the side of the reinforcement (filament) material, i.e. opposite to the pulp or microfiber layer. In a particular embodiment, laying pulp fibers and microfibers, especially by wet-laying is performed using relatively open carriers of the type above, or even more open (permeability up to 750 cfm, 21 $m^3$/min), and hydroentanglement is performed after transfer of the formed web to a carrier of a more dense type.

Drying and Possible Further Process Steps

The hydroentangled composite nonwoven material sheet web can be dried, for example by using a conventional web drying equipment, such as the types used for tissue drying, such as through-air drying or Yankee drying. After drying, the material can first be wound into mother rolls before being converted in known ways to suitable formats. The structure of the material can be changed by further processing steps such as microcreping, hot calendaring or embossing. Furthermore, one or more additive can be added such as wet strength agents, binder chemicals, latexes and/or de-bonders.

End Product

The composite nonwoven sheet material of the present disclosure as produced has three discernible layers or transactional regions as described above: a relatively pulp-rich layer or region which is adjacent to a region including the reinforcement material layered, which in turn is adjacent to a relatively microfiber-rich layer or region. The pulp fibers and microfibers each penetrate the reinforcement filaments, resulting in the layers (regions) remaining discernible, e.g. by electron microscopy, but not having sharp transitions due to the entanglement of the fibers. The relatively pulp-rich layer contains at least 50 wt. % of pulp fibers, or at least 60 wt. % of pulp fibers or more, which proportions apply at least to the outermost 5% of the cross-section of the material, or to the outermost 10% or even the outermost 20% of the sheet material. The relatively microfiber-rich layer contains at least 50 wt. % of microfibers, or at least 60 wt. % of pulp fibers or more, which proportions apply at least to the outermost 5% of the cross-section of the material, or to the outermost 10% of the sheet material, at the side opposite to the pulp-rich side. The degree of penetration is such that the above percentages at the outer regions still apply, while entanglement is sufficient for providing strength in that it is discernible by the reinforcement material (filaments) not being completely separated from the pulp fibers and microfibers. The composite nonwoven sheet material can have any shape, but frequently it will have the form of rectangular sheets of between less than 0.5 m up to several meters. Suitable examples include of lengths and widths between 20 and 80 cm, for example, between 30 and 60 cm. Suitable wipes have sizes of e.g. 40 cm×40 cm. Depending on the intended use, they may have various thicknesses of e.g. between 100 and 2500 μm, in particular from 250 to 1500 μm. The wipes may be provided as dry wipes, i.e. containing less than 0.5 g water per g dry sheet material, or pre-wetted, containing e.g. 1-6, in particular 2-4 g of water, optionally containing surfactants, preservatives or other cleaning aids, per g of dry sheet material.

The nonwoven composite sheet material according to the present disclosure is suitable for various wiping applications in industrial, medical, office and household cleaning. The nonwoven composite sheet material is in particular suitable for deep cleaning and for the cleaning of surfaces with a high hardness in particular surfaces with a high hardness having small cavities. Examples of hard surfaces include metal, polymer, glass, plexiglass and laminate surfaces. The nonwoven composite sheet material allows cleaning into small cavities where cellulose material is too large for deep cleaning. Furthermore, the nonwoven composite sheet material according to the present disclosure allows thorough cleaning as a result of the high contact area of the material of the nonwoven composite sheet material and the surface to be cleaned and to the high volume of small pores resulting in a high capillary forces. Thorough cleaning is in particular interesting for cleaning sanitizing surfaces and for all cleaning applications within the health care sector.

Furthermore, the nonwoven composite sheet material according to the present disclosure is suitable for cleaning surfaces that are sensitive for scratches or micro-scratches caused when using cellulose fibers.

The accompanying FIG. 1 schematically illustrates an equipment for carrying out an embodiment of the process of the present disclosure wherein a reinforcement material is first deposited, followed by foam laying of pulp fibers, a first hydroentanglement, depositing of microfibers and a second hydroentanglement. Revolving forming fabric 1 receives spun-laid filaments 2 from heated drawing device 4. The forming fabric 1 with the web 3 of filaments 2 is advanced to a wet-laying stage 6 wherein head box 5 deposits aqueous foam containing pulp fibers 6' onto the web 3. Excess water is drained through the forming fabric 1 by suction box 23, and can be de-aerated and returned to the foam-forming tank (not shown) The bilayer web 7 is moved to a second revolving fabric 10 in the machine direction (MD) and subjected to hydroentanglement by water jets 9 produced by hydroentanglement devices 8. Spent water is collected in boxes 25 and carried off or recycled. The fibrous web 11 is then turned at rolls 12 and 13 and moved to a third fabric 14. At stage 16, microfibers are wet laid on top of the filament side of the fibrous web by head box 15 Excess water is drained through the forming fabric 14 by suction box 24. The intermediate product 17 is moved to the next revolving fabric 20 and hydroentangled by water jets 19 from hydroentanglement devices 18 with water collection boxes 26. The resulting integrated three-component material 21 is then moved to a drying stage 22, for example including an omega drier and finalized (not shown).

Figure 2:
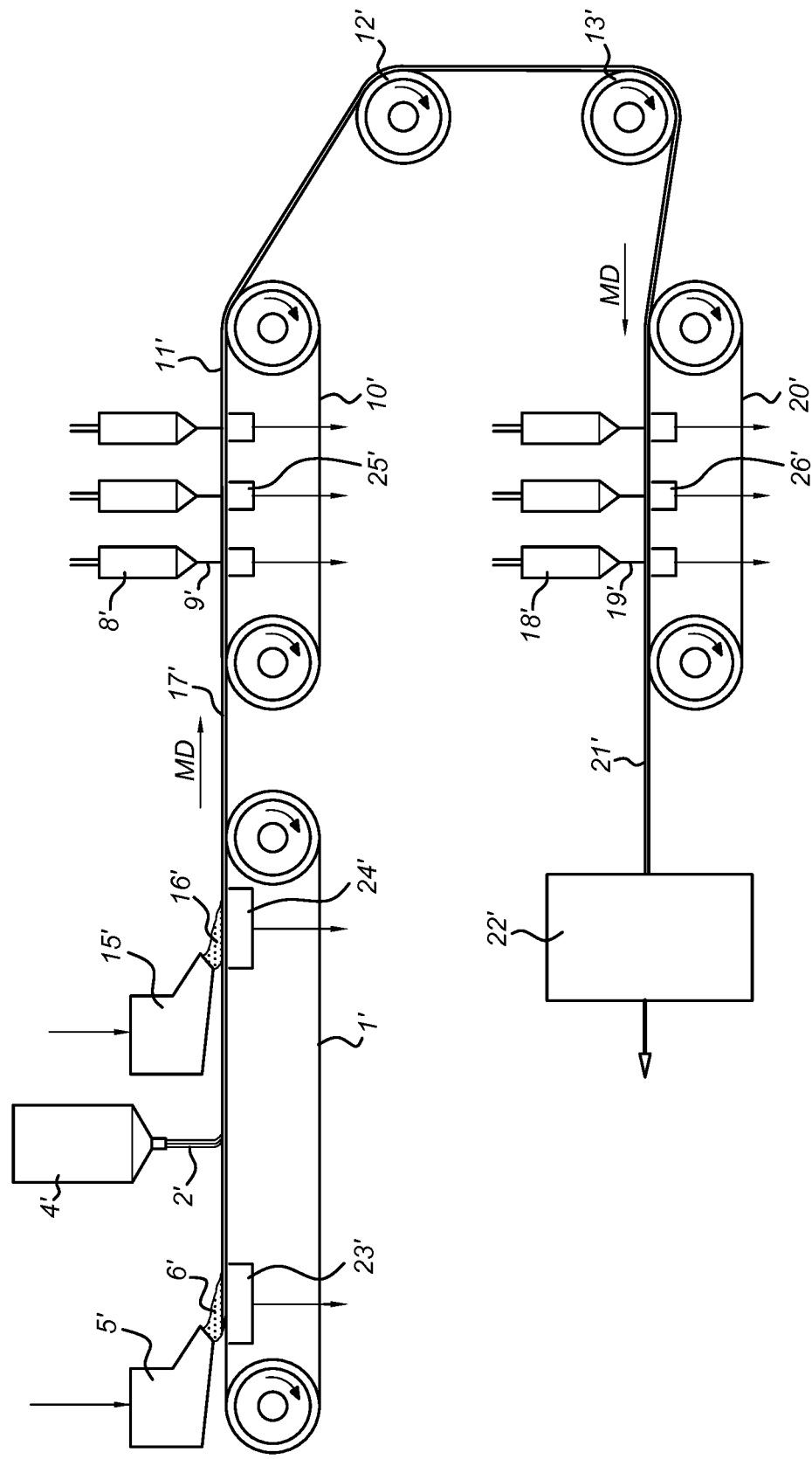
FIG. 2 shows schematically a second embodiment of a production line for producing a composite nonwoven sheet material.

FIG. 2 shows an alternative embodiment wherein pulp fibers are first deposited by foam-laying, followed by depositing reinforcement material, followed by depositing microfibers and hydroentanglement. At stage 6', aqueous foam containing pulp fibers is wet-laid on the revolving forming fabric 1' through head box 5' Excess water is drained through the forming fabric 1' by suction box 23'. Spun-laid filaments 2' produced by drawing device 4' are deposited on the wet-laid pulp fibers-6. Subsequently at stage 16', a mix of microfibers is wet laid on the first side of the intermediate structure by head box 15'. Excess water is drained through the forming fabric 1' by suction box 24'. The intermediate product 17' thus obtained is then moved in the machine direction (MD) to a second revolving fabric 10' and subjected to hydroentanglement stage by devices 8' producing jets 9', spent water being collected by boxes 25' The fibrous web 11' is then turned at rolls 12' and 13' and moved to fabric 20' and hydroentangled from the other side by water jets 19' from hydroentanglement devices 18', surplus water being collected in boxes 26'. The obtained product 21' is then moved to a drying stage 22' and then finalized.

Figure 3:
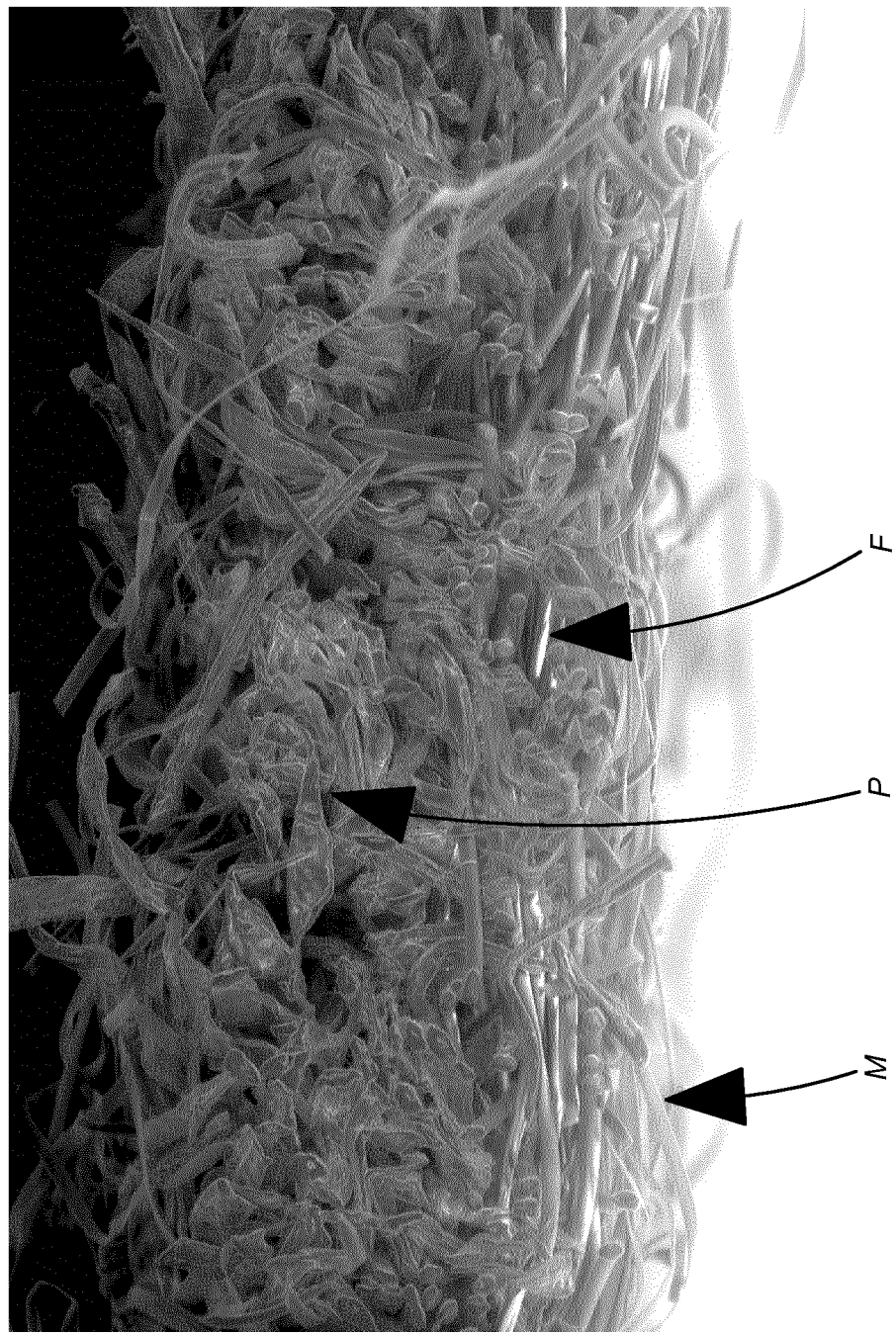
FIG. 3 is a the cross-section of a composite nonwoven sheet material according to embodiments of the invention.
Figure 4:
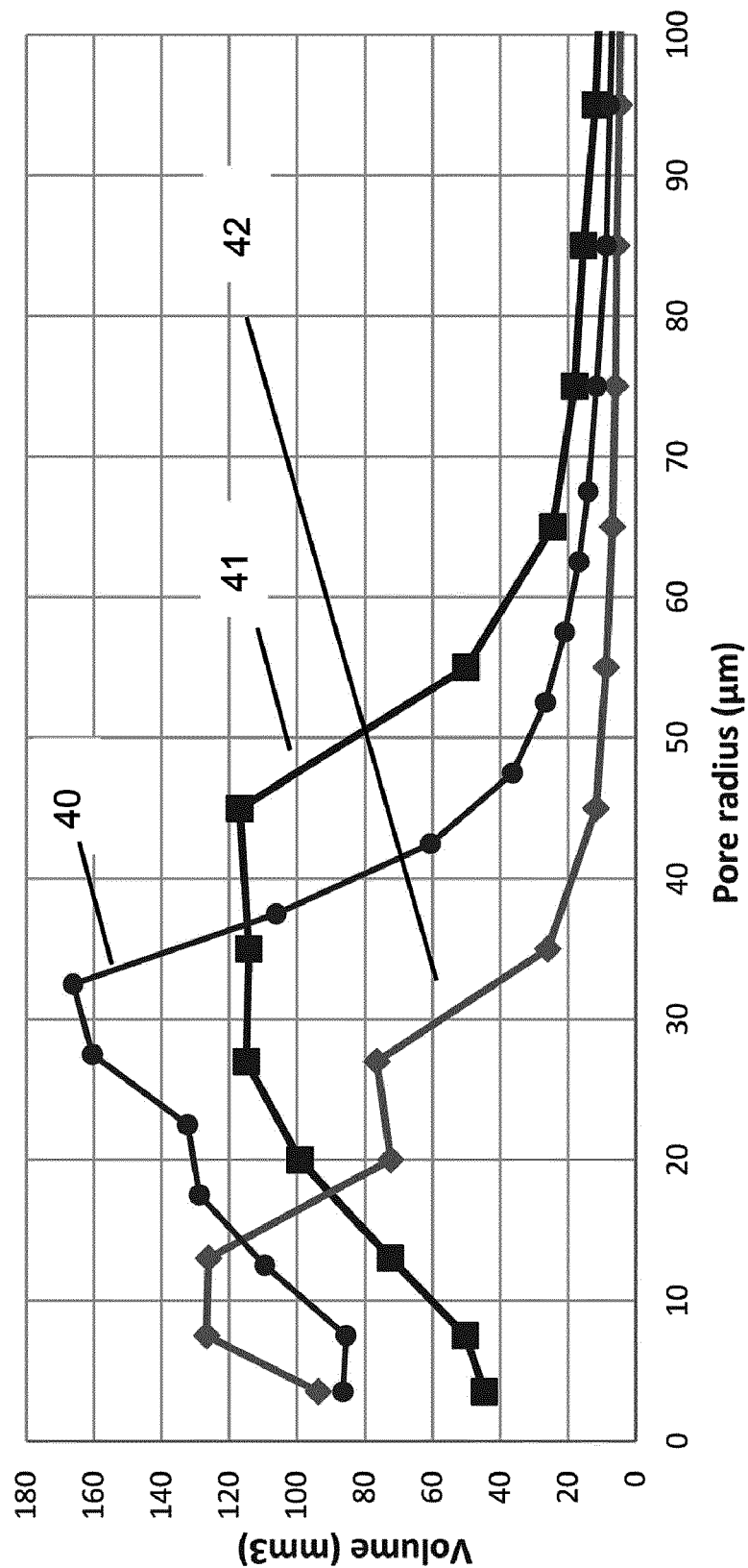
FIG. 4 is a graphical plot the Pore Volume Distribution of a sample according embodiments of the invention described herein compared with the Pore Volume Distribution of comparative example samples.

FIG. 3 is a scanning electron microscope (SEM) image showing the cross-section (250×) of the composite nonwoven material sheet of the present disclosure. The sheet comprises spun-laid filaments F as reinforcement material interposed between pulp fibers P and microfibers M. The microfibers are penetrating the reinforcement material from one side and the pulp fibers are penetrating the reinforcement material from the other side FIG. 4 shows the pore volume distribution versus pore radius of a sample according to the present disclosure (curve 40), and of comparative examples (curves 41 and 42) as further described below.

EXAMPLES, TEST METHODS AND TEST RESULTS

A composite nonwoven sheet material according to embodiments of the invention with different compositions was produced and tested and compared with comparative examples with respect to cleaning performance and liquid absorption capacity. The total basis weight of composite nonwoven sheet material was around 80 g/m² (gsm). The basis weight as measured herein is measured using a material conditioned at 23° C., 50% RH (Relative Humidity) according to ISO 187.

Example 1

A first example of a composite nonwoven sheet material was manufactured using the equipment as shown in FIG. 1A 0.4 m wide web of spun-laid polypropylene filaments 2 was laid down onto an endless forming fabric 1 at 15 m/min such that the filaments 2 were not bonded to each other. The web 3 of spun-laid filaments 2 has a weight of 20 gsm. In the wet-laying stage 6, head box 5 deposits an aqueous slurry or an aqueous foam including pulp fibers 6 was wet-laid on the web 3 of spun-laid filaments 2, excess water being sucked off. The wet laid pulp fibers have a weight of 40 gsm. The resulting intermediate product 7 has a weight of 60 gsm and was moved to a hydroentanglement stage 8. The unbonded spun-laid filaments 2 and the wet laid pulp fibers 6' were bonded together with two manifolds at a pressure of 40 bar using a single row of nozzles 9 (120 μm inlet hole and a pitch of 0.6 mm) at 15 meter/minute while being supported by the fabric 10 The energy supply at the hydroentangling was about 178 kWh/ton of the treated material. The obtained hydroentangled fibrous web 11 includes a pulp-enriched first outer layer. The fibrous web was then turned over at stages 12 and 13 and was laid onto the next forming fabric 14 with its pulp-enriched first outer layer facing the forming fabric 14. A stage 16, a mix of microfibers 46' including 17 gsm easy split PET/PA bicomponent fibers of Kuraray (3.3 Dtex×5 mm, 11 segments) and 3 gsm blue viscose fibers (Kelheim, 1.7 Dtex, 6 mm) was wet laid on top of the spun-laid side of the fibrous web by head box 15, excess water being sucked off through the forming fabric 14. Intermediate product 17 was moved to a hydroentanglement stage 18 where the remaining splittable fibers were split, and the spun-laid filaments 2 and microfibers were integrated with two manifolds at a pressure of 60 bar using a single row of nozzles 19 (120 μm inlet hole and a pitch of 0.6 mm) at 15 meter/minute while being supported by the fabric 20. The energy supply at the hydroentangling was about 234 kWh/ton of the treated material. The thus obtained material 21 was then dried and rolled.

The sample material produced was used in the test methods described herein and included 20 gsm spun-laid polypropylene, 40 gsm pulp fibers and a mix of microfibers including 17 gsm easy split PET/PA bicomponent fibers of Kuraray (3.3 Dtex×5 mm, 11 segments) and 3 gsm blue viscose fibers.

A composite nonwoven material sheet produced according to example 1 is depicted in FIG. 3, showing that the reinforcement material F is interposed between a pulp-enriched first outer layer P and a microfiber-enriched second outer layer M and that the microfibers and the pulp fibers P are penetrating the reinforcement material from either side.

Example 2

A second example of a composite nonwoven sheet material is manufactured using the equipment as shown in FIG. 2. At stage 6', aqueous slurry or aqueous foam including pulp fibers 6' is wet-laid on a forming fabric 1'. The wet-laid pulp fibers have a weight of 40 gsm. The web of wet-laid pulp fibers has a width of 0.4 m. Spun-laid polypropylene filaments 2' are deposited on the wet-laid pulp fibers. The filaments have a weight of 20 gsm Subsequently at stage 16', a mix of microfibers including 17 gsm easy split polyethylene terephthalate (PET)/polyamide (PA) bicomponent fibers of Kuraray (3.3 Dtex×5 mm, 11 segments) and 3 gsm Kelheim blue viscose fibers is wet laid on the first side of the intermediate structure. The resulting intermediate product 17' is subjected to hydroentanglement at stage 18', where the remaining splittable fibers are split, and the filaments 2', wet laid pulp fibers 6' and microfibers are integrated with two manifolds at a pressure of 60 bar using a single row of nozzles 19' (120 μm inlet hole and a pitch of 0.6 mm) while being supported by the fabric 20' The energy supply at the hydroentangling is about 234 kWh/tom of the treated material. The obtained material 21' is then dried in drier 22' and rolled. The end product is like the one of Example 1 and has a basis weight of 80 gsm.

Example 3

A further example of a composite nonwoven sheet material is manufactured using the equipment similar to the one shown in FIG. 2. This example differs from Example 2 in that the microfibers are applied before laying the filaments and the pulp fibers are applied after laying the filaments. Thus, at stage 6', an aqueous slurry including microfibers (PET/PA as at stage 16' in Example 2) is wet-laid on a forming fabric 1'. The web of wet-laid microfibers has a width of 0.4 m. Spun-laid polypropylene filaments 2' are deposited on the microfibers. The filaments have a weight of 20 gsm Subsequently at stage 16', pulp fibers are foam-laid on the first side of the intermediate structure. The resulting intermediate product 17' is subjected to hydroentanglement at stage 18', where the remaining splittable fibers are split, and the filaments 2', microfibers 6' and pulp fibers 6 are integrated with two manifolds at a pressure of 60 bar using a single row of nozzles 19'. The obtained material 21' is then dried in drier 22' and rolled. The end product is like the one of Example 1 and has a basis weight of 80 gsm.

Comparative Example 1: Sheet Material not Including Microfibers

The first comparative example provides a two-sided sheet material including pulp fibers mixed with staple fibers, and a filament reinforcement material, which is produced using an equipment as depicted in FIG. 1, but omitting the microfiber-laying stage. The 65 gsm sheet comprises about 70 wt. % cellulose pulp fibers, about 7 wt % of 1.7 Dtex polyester staple fibers and about 23 wt. % polypropylene spun-laid fibers. The material was formed by applying a first layer of the filaments followed by applying a second layer of a wet foam of the staple fibers and pulp fibers on the first layer. The two layers were hydroentangled from the pulp and staple fiber side to form an integrated material.

Comparative Example 2: Sheet Material Only Including Microfibers

The second comparative example provides a single-layer 45 gsm microfiber sheet comprising 70 wt. % polyester and 30 wt. % polyamide microfibers.

Test Method A: Household Soil Removal Capacity

In this test method, the samples are evaluated on their capacity to remove household soil, represented by a multi-component model soil. Soiled surfaces are cleaned using a wet abrasion scrub tester. The cleaning performance is evaluated visually after 25 wipes.

Preparation of the Soil

The model soil mixture comprises aged sunflower oil, humus, carbon black, iron black, cement, silica and clay. The sunflower oil is aged by heating and is then mixed with an organic solvent in a 1:1 volume ratio for 24 hours, followed by the addition of the other ingredients.

Application of the Soil

The soil is applied onto the test surfaces, i.e. on white floor tiles (30×30 cm) in an amount of 10 g/tile. The soiled surface is 208 $cm^2$. After application of the soil onto the test surface, the soil is aged for 24 hours at room temperature.

Wiping Test

The soiled surfaces are cleaned with a wet abrasion scrub tester (Sheen Wet Abrasion Scrub Tester REF 903 PG (20 wipes/minute)). The wet abrasion scrub tester allows to test four samples parallel on one tile. During the entire test, the position of each sample is randomized in the wet scrub tester.

After fixing the samples on the wet abrasion scrub tester, the cleaning procedure starts and the wet abrasion scrub tester produces backward and forward rubbing movements. The cleaned tiles are rinsed off under running water and are dried at room temperature.

Evaluation of the Cleaning Performance

The cleaned and dried tiles are evaluated visually. The evaluation is performed according to the following scale by three panelists.
Score 10: 100% soil removal
Score 5: 50% soil removal
Score 0: 0% soil removal Test Method B: Cleaning Efficiency Using Wet Wipes In this test method, the Cleaning Efficiency (CE) of different materials is evaluated. The soil used in the method is a kitchen like soil containing a mixture of egg yolk, milk, oil and Blankophor® (of Bayer AG and Indulor Chemie GmbH, of Germany). The soil is mixed thoroughly and spread on a steel plate, 0.25 mm thick film. The plate is dried in a climate room (23° C. and 50% Relative Humidity, RH) for 1 hour and 15 minutes. After drying, the plates are photographed in a UV cabinet ("before picture"). The dirt is wiped off with a wet wipe and the plate is photographed again ("after picture"). Blankophor® is added for detection purpose. When Blankophor® is exposed to UV light it emits blue light and this property is used by comparing the emitted blue light before and after wiping. For evaluation, the photos are converted to greyscale and analyzed with an image software and before and after wiping values are compared.

Preparation of the Dirt

Preparation of Blankophor® solution: 0.125 g Blankophor® is weighted and dissolved in 50 ml distilled water giving a concentration of 2.1 mmol/l. The solution is kept in the dark and stored in a refrigerator. The solution should be shaken before use.

Preparation of egg yolk: Egg yolks from tetra packs (available from Kronägg) are pre-divided into 20 ml portions in plastic bags or plastic tubes and stored in a freezer (−20° C.) for at least 48 hours before the experiment.

Preparation of the dirt: Mix 20 ml egg yolk and 3 ml oil (olive oil, pure virgin, Acros Organics). Dissolve 3 g milk powder (Semper) with 10 ml water. Mix the egg-oil mixture and the milk and thoroughly in e.g. a plastic add finally add 0.5 ml Blankophor® solution. To avoid air bubbles the soil preparation is allowed to rest for about 30 minutes.

Preparation of Test Samples

The material to be tested should have a size of about 15×20 cm, so as to test the sheets in MD (Machine Direction). Dry sheets can be loaded with a defined amount of water by multiplying the dry weight of the material with the liquid loading (LL) needed, e.g. 3.0 g*2.5=7.5 ml water is to be added to get a LL of 250%. The loading is preferably made by hand by weighing the dry material, soaking in water and squeezing out liquid by hand until the weight of the sheet corresponds to the precalculated LL.

Test Procedure

Clean steel plates (SS 2343, 15×15 cm) are cleaned in a dish washer. 1.5 ml of the dirt is applied with a pipette on each plate. The soil is spread out on the plates with a spatula by applying a force between 3 and 4 kg to form a soil film with a thickness of about 0.25 mm. Care should be taken that the soil is evenly distributed on the surface without rupture in the soil film.

After the plates have been dried for 1 h and 15 minutes, a photo of the plates is taken in a UV cabinet. This photo is referred to as the "before picture". To have a constant area a black frame made in paper, 15×15 cm with an open area of 5×5 cm is applied on the soil film. The camera used is a Canon Powershot® camera (Aperture, F:2.8, Exposure time ¼ sec).

To perform the wiping tests, the plates are fastened on a table with tape. The material to be tested is wrapped around a wiping block with a gummed side (with the gummed side oriented down to the steel plate) and fastened with a clamp, wiping is made in machine direction (MD). To get more force applied and to mimic the force applied when the wiping is done manually, 800 g extra weights are applied to the wiping block. The wiping speed is 0.1 m/s. The wiping is done twice in the same direction using the same material. After wiping, the steel plate is dried at room temperature for about 5 minutes before a photo is taken in the UV cabinet under the same conditions as the "before picture." The photo is referred to as the "after picture." Each sample is tested in 8 replicates.

Calculation and Expression of Results

The "before picture" and the "after picture" are analyzed with image software using Image pro 6.2 (Image analysis program) and greyscale values of the dirt (initial and after) are calculated. The wet wipe gets a CE value in percentage calculated as follows:

CE Value (%)=(before picture−after picture)/before picture*100

The mean value for the 8 replicates is calculated and this value is reported with one decimal. A high % value indicates a wipe with good CE and a low % value indicates a wipe with poor CE.

Test Method C: Cleansing Efficiency of Skin—Food and Feces Dirt

In this method, the efficiency of wiping off artificial dirt on skin is evaluated. The formulation of the dirt is made to be relevant for food residues of faeces. The dirt contains sweetened condensed milk (160 g), cocoa powder (18 g) and rapeseed oil (52 g).

The artificial dirt (0.1 g) was applied on marked squares (2.8×2.8 cm) on the volar forearm of test persons. The dirt was evenly distributed by a spatula to evenly cover the whole marked square on the arm.

The wiping was made as repeatable as possible. The dry tissue was mounted flat around a wiping block (weight 310 g). The wiping was performed in two strokes. The wiping was performed without applying any additional pressure beside the weight of the block.

The device for measuring dirt residues on the skin was a Sebumeter®. (Sebumeter SM810 from Courage+Khazaka (accuracy±0.0003 g)). The remaining amount of dirt (amount of grease in the dirt, μg/cm$^2$) that was left after wiping with the different tissue products was measured. All measurements were done in four replicates. Small value means less dirt left, high value means a lot of dirt left.

Test Method D: Bacteria Wiping Method

The method measures the reduction of living bacteria on a surface after wiping. The treated wipe or tissue is compared to an untreated wipe or tissue. Desired is as high log reduction of living bacteria as possible on the wiped. All measurements are made in 5 replicates.

Test Procedure

Solid surfaces, laminate surfaces (IKEA® table, a square 10×10 cm) are soiled with organic dirt (100 ml milk with 3% fat content with 1 egg yolk mixed 1:1 with bacteria overnight culture, (*S. aureus* (ATCC 6538)). 0.5 ml of this blend is added to each square. The test liquid is distributed to form an even layer on the surface. The material is weight before and after wetting (put the material under tap water and squeeze the material). After drying (1.5 h at room temperature) the surfaces are wiped in a standardized manner. The wipe is mounted on a block of 1.5 kg. Wiping is performed with two strikes perpendicular to each other. One minute after wiping, the bacteria, remaining on the surfaces, are collected (swab with neutralizing Letheen® bullion) and counted by traditional cultivation techniques (Nutrient Agar).

Calculation and Expression of Results

The reduction in bacteria is determined using the following formula:

Log $R$=log $N$−log $D$

With R=reduction of bacteria
N=Number of living bacteria on test surface before wiping, (CFU)
D=Number of remaining bacteria on the test surface after wiping (CFU)

Test Method E: Determination of the Peak Extreme Height Parameter $S_{xp}$ (0-50%)

Preparation of the Sample

First the weight of a dry sample is determined. Subsequently the sample is wetted during 10 seconds, the wetted sample is squeezed by hand and the weight of the wetted sample is determined.

Measurement of the Samples

The samples are analyzed using a structured light 3D scanner using a MikroCAD® compact 26×20 mm apparatus from GFMesstechnik GmbH (measurement area: 26×20×5 mm, lateral resolution: 16×16 μm, vertical resolution: 2 μm).

A flat glass (area 0.0084 m$^2$) is placed on the sample to be analyzed. Pressure is applied using a compression unit against the flat glass. Evaluation area is 26×20 mm. A short filter (S-filter), gauss filter cut-off of 0.0614 mm, is applied in order to reduce noise from the measurement system. Surface data is then levelled using least square plane (F-operator). The material ratio curve (Abbott-Firestone curve) is determined and threshold between 0.1% material ratio and 99.8% material ratio. The height $S_{xp}$ (0-50%) is derived from this threshold material ratio curve.

Test Method F: Pore Volume Distribution Measurement

The Pore Volume Distribution measurements are made using a TRI Autoporosimeter® (TRI (Textile Research Institute) Princeton Inc., NJ, USA). The data are analyzed using appropriate software.

Determining the Pore Volume Distribution involves recording the increment of liquid that enters a porous material as the surrounding air pressure changes. A sample in the test chamber is exposed to precisely controlled changes in air pressure. The size (radius) of the largest pore able to hold liquid is a function of the air pressure. As the air pressure increases (decreases), different size pore groups drain (absorb) liquid. The pore volume of each group is equal to this amount of liquid, as measured by the instrument at the corresponding pressure. The effective radius of a pore is related to the pressure differential by the following relationship:

Pressure differenial=[(2$\gamma$ cos $\theta$)]/effective radius]

with $\gamma$=liquid surface tension, and $\theta$=contact angle.

Typically, pores are thought of in terms such as voids, holes or conduits in a porous material. It should be noted that this method uses the above equation to calculate effective pore radii based on the constants and equipment controlled pressures. The above equation assumes uniform cylindrical pores. Usually, the pores in natural and manufactured porous materials are not perfectly cylindrical, nor all uniform. Therefore, the effective radii reported here may not equate exactly to measurements of void dimensions obtained by other methods such as microscopy. However, these measurements do provide an accepted method to characterize relative differences in void structure between materials.

The equipment operates by changing the test chamber air pressure in user-specified increments, either by decreasing pressure (increasing pore size) to absorb liquid, or increasing pressure (decreasing pore size) to drain liquid. The liquid volume absorbed at each pressure increment is the cumulative volume for the group of all pores between the preceding pressure setting and the current setting. The liquid used is 0.1 wt. % Triton X-100 GR p.a. (Merck KGaA, Darmstadt, DE) in distilled water. The instrument calculation constants are as follows: p (density)=1 g/cm$^3$; γ (surface tension)=32 dynes/cm; cos( )=1. A 0.22 mm Millipore Glass Filter (Millipore Corporation of Bedford, MA, USA; Catalog #GSWP09025) is employed on the test chamber's porous plate. The following sequence of pore sizes (pressures) are used (effective pore radius in mm): 500, 450, 400, 350, 300, 250, 200, 175, 150, 135, 125, 115, 100, 90, 80, 70, 65, 60, 55, 50, 45, 40, 35, 30, 25, 20, 15, 10, 5, 2. This sequence starts with the saturated sample, subsequently desaturated under pressure as the pore settings decrease (typically referred to with respect to the procedure and instrument as the 1st absorption).

Test Method G: Liquid Absorbance Capacity Measurement

The liquid absorbance capacity is determined following the DIN 54540-4 standard with the deviation that soaking the samples is done by hanging vertically instead of putting them horizontally.

Test Results

Cleaning Performance

The cleaning performance of a composite nonwoven material sheet according to the present disclosure is tested using Test Method A, Test Method B, Test Method C and Test Method D and was compared with the cleaning performance of two comparative examples as described hereinabove.

The cleaning test methods are referred to as Test Method A, Test Method B, Test Method C and Test Method D. Each of the cleaning test methods is described below in more detail.

The cleaning performance results obtained by the different cleaning test methods are given in Table 1.

TABLE 1

| | Cleaning performance of the samples | | | |
|---|---|---|---|---|
| | Test Method A Assessment 0-10 10 = best | Test Method B Scale 0-100 100 = best | Test Method C Remaining dirt in μg/cm$^2$ low = best | Test Method D Bacteria log reduction high = best |
| Comparative example 1 | 1.5 | 48 | 122 | 2.06 (sd 0.41) |
| Comparative example 2 | 4.5 | 54 | 49 | 4.7 (sd 0.96) |
| Example 1 | 8.5 | 58 | 42 | 4.6 (sd 0.43) |

As shown in Table 1, Example 1 has a consistently better cleaning performance in the four tests than comparative example 1 and a similar (Test Method B and Test Method D) or better (Test Method A and Test Method C) performance compared to comparative example 2.

The ease or difficulty to remove dirt using a wipe is evaluated by a surface texture analysis method. The surface texture analysis method is described below in more detail and is referred to as method E.

The performance of comparative example 1, comparative example 2 and the example according to the disclosure obtained by method E is expressed as the peak extreme height parameter $S_{xp}$ (0-50%) and is given in table 2 using two different loads: 1.3 kg load and 4.5 kg load. The amplitude $S_{xp}$ (0-50%) is calculated from the material ratio curve (Abbott-Firestone curve) and corresponds with the height between 0% material and 50% material. The lower the amplitude, the higher the contact area between the wipe and the surface to be cleaned. At the contact area the wipe touches the surfaces offering possibilities to touch and release the dirt that needs to be removed. Consequently, a higher contact area between the wipe and the surface to be cleaned means that dirt is released easier without putting extra pressure to the wipe.

TABLE 2

| | $S_{xp}$(0-50%) amplitude | |
|---|---|---|
| | Test Method E | |
| | 1.3 kg | 4.5 kg |
| Comparative example 1 | 130 | 110 |
| Comparative example 2 | 62 | 40 |
| Example 1 | 76 | 56 |

From the test results given in Table 2 can be concluded that the sample according to the present disclosure shows a lower amplitude than comparative example 1 and approaches the amplitude of comparative example 2.

The Pore Volume Distribution of the sample according to the disclosure and of comparative example 1 and comparative example 2 was determined using a method described below in more detail and referred to as method F. Further details of the method can be found in EP2496769.

The Pore Volume Distribution curves of the tested samples are given in FIG. 4. Curve 40 (spheres) corresponds with the curve of the sample according to the present disclosure, curve 41 (cubes) corresponds with the curve of comparative example 1 and curve 42 (diamonds) corresponds with the curve of comparative example 2. Each of the curves show two peaks: a first peak (at lower radius) corresponds with the bulk pores; a second peak (at higher radius) corresponds with the surface pores. The pore radius of the bulk pores and of the surface pores are summarized in Table 3. The cumulative volume at 20 μm pore radius and the cumulative volume at 100 μm pore radius are given in table 4.

TABLE 3

Pore radius of the bulk pores and surface pores

| | Pore Radius | |
|---|---|---|
| | Bulk pores (μm) | Surface pores (μm) |
| Comparative example 1 | 27 | 45 |
| Comparative example 2 | ~10 | 27 |
| Example 1 | 18 | 33 |

TABLE 4

Cumulative volume of pores

| | Cumulative volume | |
|---|---|---|
| | at 20 μm (mm³) | at 100 μm (mm³) |
| Comparative example 1 | 2.3 | 6.5 |
| Comparative example 2 | 2.1 | 3.8 |
| Example 1 | 2.5 | 4.6 |

The sheet of Example 1 has a high cumulative volume at 20 p.m. Since smaller pores have higher capillary forces, a high cumulative volume at this low pore radius range is preferred. Consequently, a high cumulative volume at the low pore size radius enables the sheet to have a good dry wiping ability. At least 50% of the total pore volume of Example 1 exists in pores having a pore radius lower than 20 μm.

The liquid absorbance capacity of the sample according to the present disclosure and of comparative example 1 and 2 was determined following the DIN 54504-4 standard with the deviation that soaking the samples was done by hanging vertically instead of putting them horizontally. The liquid absorbance capacity is given in Table 5.

TABLE 5

Liquid absorbance capacity

| | Liquid absorbance capacity (g/g) |
|---|---|
| Comparative example 1 | 5.7 |
| Comparative example 2 | 3.1 |
| Example 1 | 8.0 |

From the results given in Table 5 it can be concluded that Example 1 shows the highest liquid absorbance capacity.

Test Method H—Thickness

The thickness of a sheet material can be determined by a test method following the principles of the Standard Test Method for Nonwoven Thickness according to EDANA, WSP 120.6.R4 (12). An apparatus in accordance with the standard is available from IM TEKNIK AB, Sweden, the apparatus having a Micrometer available from Mitutoyo Corp, Japan (model ID U-1025). The sheet of material to be measured is cut into a piece of 200×200 mm and conditioned (23° C., 50% RH, ≥4 hours). During measurement the sheet is placed beneath the pressure foot which is then lowered. The thickness value for the sheet is then read off after the pressure value is stabilised. The measurement is made by a precision micrometer, wherein a distance created by a sample between a fixed reference plate and a parallel pressure foot is measured. The measuring area of the pressure foot is 5×5 cm. The pressure applied during the measurement is 0.5 kPa. Five measurements are performed on different areas of the cut piece to determine the thickness as an average of the five measurements.

What is claimed is:

1. A composite nonwoven sheet material comprising pulp fibers,
   a reinforcement material, and microfibers, wherein the sheet material comprises:
   one pulp-enriched first outer layer including at least 80 wt. % of pulp fibers in an outermost 5% of a thickness of the sheet material,
   one microfiber-enriched second outer layer including at least 60 wt. % of microfibers in an outermost 5% of a thickness of the sheet material, and
   wherein the reinforcement material comprises spunlaid filaments and is interposed as a reinforcement material layer between the pulp-enriched first outer layer and the microfiber-enriched second outer layer,
   wherein the pulp fibers and the microfibers penetrate the reinforcement material,
   wherein the composite nonwoven sheet material has bulk pores having a maximum pore volume distribution at a pore radius between 5 and 30 μm and which has surface pores having a maximum pore volume distribution at a pore radius between 25 and 40 μm,
   wherein the composite nonwoven sheet material is a hydroentangled fibrous web comprising the reinforcement material layer having a first side and a second side, the reinforcement material being interposed between pulp fibers applied on the first side of the reinforcement material and microfibers or splittable fibers for providing the microfibers applied on the second side of the reinforcement material, and
   wherein the composite nonwoven sheet material has a liquid absorbance capacity ranging between 5.5 and 8 grams of liquid per gram of composite nonwoven sheet material.

2. The sheet material of claim 1, wherein the pulp fibers have fiber lengths between 1 and 6 mm and the microfiber-enriched second outer layer includes at least 90 wt. % of microfibers fibers in the outermost 5% of the thickness of the sheet material.

3. The sheet material of claim 1, wherein the microfibers have a mass density of 1 Dtex or less.

4. The sheet material of claim 1, wherein the microfibers have a length of 18 mm or less.

5. The sheet material of claim 1, wherein the reinforcement material comprises synthetic filaments of a thermoplastic polymer.

6. The sheet material of claim 1, wherein the sheet material comprises 25-80 wt. % of pulp fibers, 10-40 wt. % of reinforcement material and 10-40 wt. % of microfibers.

7. The sheet material of claim 6, wherein the sheet material comprises 40-65 wt. % of pulp fibers, 15-30 wt. % of reinforcement material and 15-30 wt. % of microfibers.

8. A process of producing the composite nonwoven sheet material of claim 1, comprising:
   forming the fibrous web comprising the reinforcement material layer having a first side and a second side, the reinforcement material being interposed between the pulp fibers applied on the first side of the reinforcement material and the microfibers applied on the second side of the reinforcement material; and
   hydroentangling the fibrous web to form the composite nonwoven sheet material.

9. The process of claim 8, wherein the fibrous web is manufactured in a process comprising:
provide the reinforcement material layer having a first side and a second side;
applying pulp fibers on the first side of the reinforcement material by wet laying, dry laying or air laying;
hydroentangling the reinforcement material provided with the pulp fibers applied on the first side of the reinforcement material; and
applying microfibers or splittable fibers for providing the microfibers on the second side of the reinforcement material by wet laying, dry laying or air laying to obtain the fibrous web.

10. The process of claim 8, wherein the fibrous web is manufactured in a process comprising:
providing a layer comprising pulp fibers by wet laying, dry laying or air laying,
applying the reinforcement material layer on one side of the layer comprising pulp fibers by wet laying, dry laying or air laying;
hydroentangling the layer comprising pulp fibers provided with the reinforcement material layer; and
applying microfibers or splittable fibers for providing the microfibers on the reinforcement material layer by wet laying, dry laying or air laying to obtain the fibrous web.

11. The process of claim 8, wherein the fibrous web is manufactured in a process comprising:
providing a layer comprising microfibers or splittable fibers for providing the microfibers by wet laying, dry laying or air laying,
applying the reinforcement material layer on one side of the layer comprising the microfibers, by wet laying, dry laying or air laying;
hydroentangling the layer comprising microfibers provided with the reinforcement material; and
applying pulp fibers on the reinforcement material layer by wet laying, dry laying or air laying to obtain the fibrous web.

12. The process of claim 8 which further comprises:
two hydroentanglement steps at different sides of the fibrous web.

13. A wipe comprising the composite nonwoven sheet material of claim 1.

14. The process of claim 9, which further comprises:
two hydroentanglement steps at different sides of the fibrous web.

15. The process of claim 10, which further comprises:
two hydroentanglement steps at different sides of the fibrous web.

16. The process of claim 11, which further comprises:
two hydroentanglement steps at different sides of the fibrous web.

17. The sheet material of claim 2, wherein the microfibers have a mass density of 1 Dtex or less,
wherein the microfibers have a length of 18 mm or less,
wherein the reinforcement material comprises synthetic filaments of a thermoplastic polymer, and
wherein the sheet material comprises 40-65 wt. % of pulp fibers, 15-30 wt. % of reinforcement material and 15-30 wt. % of microfibers.

18. The sheet material of claim 17, wherein the synthetic filaments of a thermoplastic polymer comprise a polyolefin, a polyester or a polylactide.

19. The sheet material of claim 1, wherein the pulp-enriched first outer layer includes at least 90 wt. % of pulp fibers in the outermost 5% of the thickness of the sheet material.

20. The sheet material of claim 1, wherein the composite nonwoven sheet material has a total basis weight ranging between 50 and 100 g/m$^2$.

* * * * *